US006622377B1

(12) United States Patent
Johnson et al.

(10) Patent No.: US 6,622,377 B1
(45) Date of Patent: Sep. 23, 2003

(54) WHEEL BEARING WITH SEPARABLE INNER RACE PROCESSING FEATURE

(75) Inventors: David N. Johnson, Bay Village, OH (US); Bruce T. Rockwell, Huron, OH (US); Terence Joseph Kehres, Sandusky, OH (US); David L. Schoewe, Port Clinton, OH (US); Debbie Sue Wadsworth-Dubbert, Port Clinton, OH (US)

(73) Assignee: Delphi Technologies, Inc., Troy, MI (US)

( * ) Notice: Subject to any disclaimer, the term of this patent is extended or adjusted under 35 U.S.C. 154(b) by 67 days.

(21) Appl. No.: 09/695,733

(22) Filed: Oct. 24, 2000

(51) Int. Cl.[7] ................................................. B21K 1/40
(52) U.S. Cl. ................. 29/724; 29/894.362; 29/898.07; 29/898.062; 72/82; 72/370.11
(58) Field of Search ................................. 384/544, 537, 384/589, 545, 546; 29/724, 894.362, 898.07, 898.09, 898.062; 301/105.1; 72/74, 82, 84, 370.11

(56) References Cited

U.S. PATENT DOCUMENTS 4,893,960 A * 1/1990 Beier et al.
6,280,096 B1 * 8/2001 Miyazaki et al.
6,485,187 B1 * 11/2002 Meeker et al.
2002/0006240 A1 * 1/2002 Sawai et al. ................ 384/544

FOREIGN PATENT DOCUMENTS

JP          11-129703          * 5/1999

* cited by examiner

Primary Examiner—Gregory Vidovich
Assistant Examiner—Eric Compton
(74) Attorney, Agent, or Firm—Scott A. McBain

(57) ABSTRACT

A wheel bearing assembly for supporting a wheel and apportioned vehicle mass is provided. The assembly includes a spindle member defining a rotational axis with a flange for attaching a wheel and a hub assembly. A bearing assembly has inner and outer bearing members in spaced relationship from one another with a plurality of rolling members interposed between the bearing members to permit relative rotation between the bearing members about the rotational axis. The spindle is deformed around the inner bearing member to prevent axial translation between the spindle and the inner bearing member about the rotational axis. An outer surface of the inner bearing member has a geometric feature for receiving a force applied from a tool during the deformation of the spindle thereby reducing radial deflections of the inner bearing member during the process of deforming the spindle.

2 Claims, 3 Drawing Sheets

WHEEL BEARING WITH SEPARABLE INNER RACE PROCESSING FEATURE

TECHNICAL FIELD

This invention relates to methods of bearing design, manufacture and assembly and specifically to a double row ball bearing of the type in which a separable inner race is integrally retained to a central spindle with an improved method of maintaining the shape and position of the inner race during the bearing retention feature formation process.

BACKGROUND OF THE INVENTION

Wheel bearing assemblies typically embody a dual row of rolling elements with varying degrees of raceway integration into the supporting structural members. These assemblies typically incorporate a rotating inner member or spindle that provides a wheel attachment feature and an integral bearing race member. It also typically incorporates a non-rotating outer member or hub that provides attachment to the vehicle and may have both bearing members integrated into the structural member. The design permits relative rotation between the spindle and hub. For wheel bearing assemblies that do not have both race ways integrated with the spindle, the inboard separable inner race member must be secured to the spindle. The inner race is typically secured rotationally to the spindle member via an interference fit. Some applications are such that additional retention features are required to maintain the axial position of the inner race relative to the outer race in order to maintain bearing preload and to maintain wheel and bearing assembly integrity. This has been accomplished in several ways that have presented unique problems. One primary method, used preferably due to its lower cost than other methods, is to plastically deform the end of the spindle along its axis to form a radially extending tab of spindle material to permanently axially retain the separable bearing member on the spindle. One difficulty with this method is that in plastically deforming the spindle the bearing member is overstressed due to excessive radial expansion. This stress can lead to premature failure of the bearing assembly caused by noise associated with fracturing of the inner member, relative rotation between the bearing member and the spindle, noise associated with reduced rolling contact fatigue life of the inner member, and the like.

Many ways of attempting to reduce the stress on the bearing member during this process have been used. However, most of these methods also have complications of either not sufficiently reducing the stress or are significantly complex and/or costly. One method includes trying to accurately predict the forces involved in deforming the spindle such that the process can be controlled to minimize the stress on the bearing member. Unfortunately, this technique has not proven successful in reducing forming related stresses sufficiently to avoid premature failure of the bearing member. Another technique includes adding material to the bearing member to compensate for the deformation caused by the stresses. While the extra material does increase the strength of the bearing member, the changed geometry affects the design of the entire assembly often resulting in unacceptable space requirements for the assembly.

Other methods involve incorporating design features into the inner member or spindle to allow for expansion of the spindle during forming. Such features as reduced initial press-fit and spindle swelling "relief" designs have proven inconsistently effective in preventing excessive hoop stress development in the inner race member. One such design is described in U.S. Pat. No. 5,822,859. In this reference the inner race member contains a shallow conical relieved surface along an inner edge of the race member allowing expansion of the member during forming. Another method involves alternative methods of deforming the spindle including heat rather than mechanical force. Again the use of such a process as heat significantly increases the complexity and cost of forming the bearing assembly.

Therefore, an apparatus and method for securing the inner race to the bearing assembly is needed such that the inner member is not significantly disturbed during the retention forming process thereby not affecting the lifespan of the assembly.

SUMMARY OF THE INVENTION

The present invention provides a wheel bearing assembly for supporting a wheel. The assembly includes a spindle defining a rotational axis with a flange for securing the wheel thereto and a hub for attaching the assembly to a vehicle. The assembly includes an inner rack bearing member held in place by the spindle spaced from the hub by a plurality of rolling elements interposed between the inner bearing member and the hub to permit relative rotation between the hub and the spindle about the rotational axis. An outer surface of the inner bearing member has a featured surface. A force is applied to the feature on the outer surface of the inner bearing member by a mating feature on a tool during the forming of an end of the spindle. The mating feature of the tool and the inner race bearing member create a radial force that opposes the forces on the inner race bearing member imposed during the spindle forming process thereby reducing the radial expansion stress imposed on the inner bearing member. A constraining of the inner race member during the formation of the spindle also helps prevent a rotation between the inner race member and the spindle during use that may occur if the inner race is allowed to expand during forming of the spindle as in the prior art.

Another aspect of the present invention provides a method of securing a separable inner race to a spindle whereby the inner race is not overstressed during the process. First, a bearing member (separable race) is provided having a featured outer surface. The spindle or wheel assembly member has an interior cavity defined by an interior surface. Second, the bearing member is arranged onto the wheel assembly member. Next, a forming tool is inserted into the interior cavity of the wheel assembly member and a process tool with a featured outer surface is mated with the outer surface of the bearing member. An axial and resultant tangential force is applied against the bearing member by the process tool to reduce the stresses against the inner race introduced during the deforming of the spindle around the bearing member by the forming tool.

Accordingly, an apparatus and method is introduced for securing an inner race to a wheel assembly in which the resulting stresses to the inner bearing assembly are minimized during, the process thereby maintaining the bearing assembly quality and performance.

BRIEF DESCRIPTION OF THE DRAWINGS

Other advantages of the present invention can be understood by reference to the following detailed description when considered in connection with the accompanying drawings wherein.

DESCRIPTION OF THE PREFERRED EMBODIMENT

Figure 1:
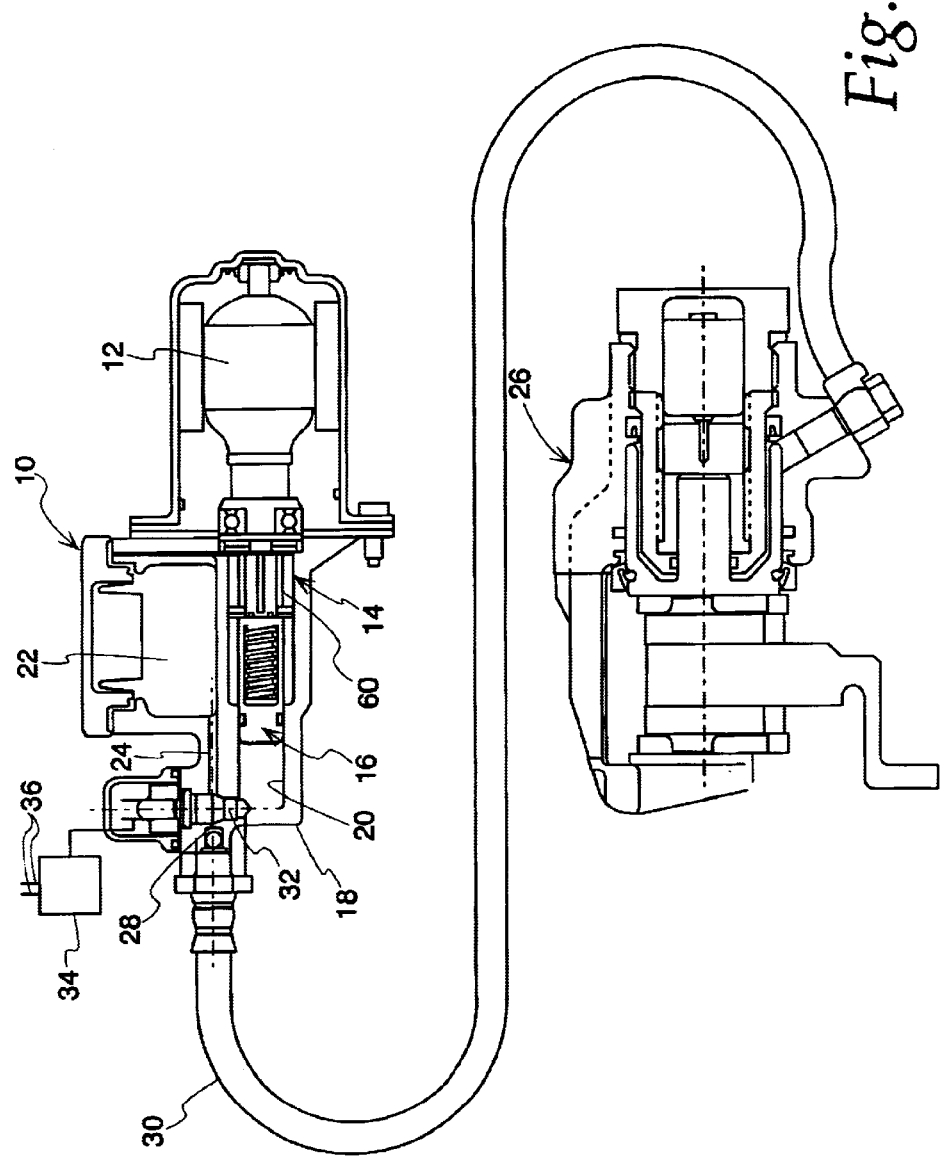
FIG. 1 is a cross-sectional view of a spindle secured to a bearing member in accordance with the present invention with a forming tool and a constraining tool in an engaged position.

A wheel bearing assembly 10 is shown in FIG. 1 for supporting a wheel (not shown) and apportioned vehicle mass. A spindle 12 defines a rotational axis A; and a hub 14 supports the spindle 12. The hub 14 may be secured to a portion of the vehicle (not shown) by fasteners or the like. The spindle 12 has a flange 17 for securing the wheel thereto. In the embodiment shown in FIG. 1, spindle 12 is rotatable about rotational axis A.

Bearing assembly 10 has an inner first bearing member 20, an inner second bearing member 23, an outer first bearing member 22, and an outer second bearing member 27 in spaced relation with one another and a plurality of rolling elements 24, such as balls, rollers, or tapered rollers, spaced by a plurality of separators 25. Rolling elements 24 are interposed between the inner 20, 23 and outer 22, 27 bearing members to permit relative rotation between them about the rotational axis A. The inner first bearing member 20 is adjacent the spindle 12 and the outer first 22 and second 27 bearing members are integral portions of the hub 14. In the embodiment shown, the inner second bearing member 23 is integrally formed with the spindle 12.

The inner first bearing member 20, which is a separable inner race, includes an inner surface 28 and an outer surface 70. The spindle 12 has an outer surface 32 that supports the inner surface 28 of the inner first bearing member 20 at a proximal end 84 of spindle 12. The spindle 12 further includes an interior cavity 36 with an interior surface 38 and a shoulder 75 for supporting a base 76 of the inner first bearing member 20. The shoulder 75 acts to support the base 76 of the inner first bearing member 20 during the formation of the proximal end 84 of the spindle 12. The outer surface 70 is featured with a geometry that cooperates with a constraining tool 56 to prevent deformation of the inner first bearing member 20 during the formation of the proximal end 84 of the spindle 12. The geometry of outer surface 70 is further detailed in the method description below.

Figure 2:
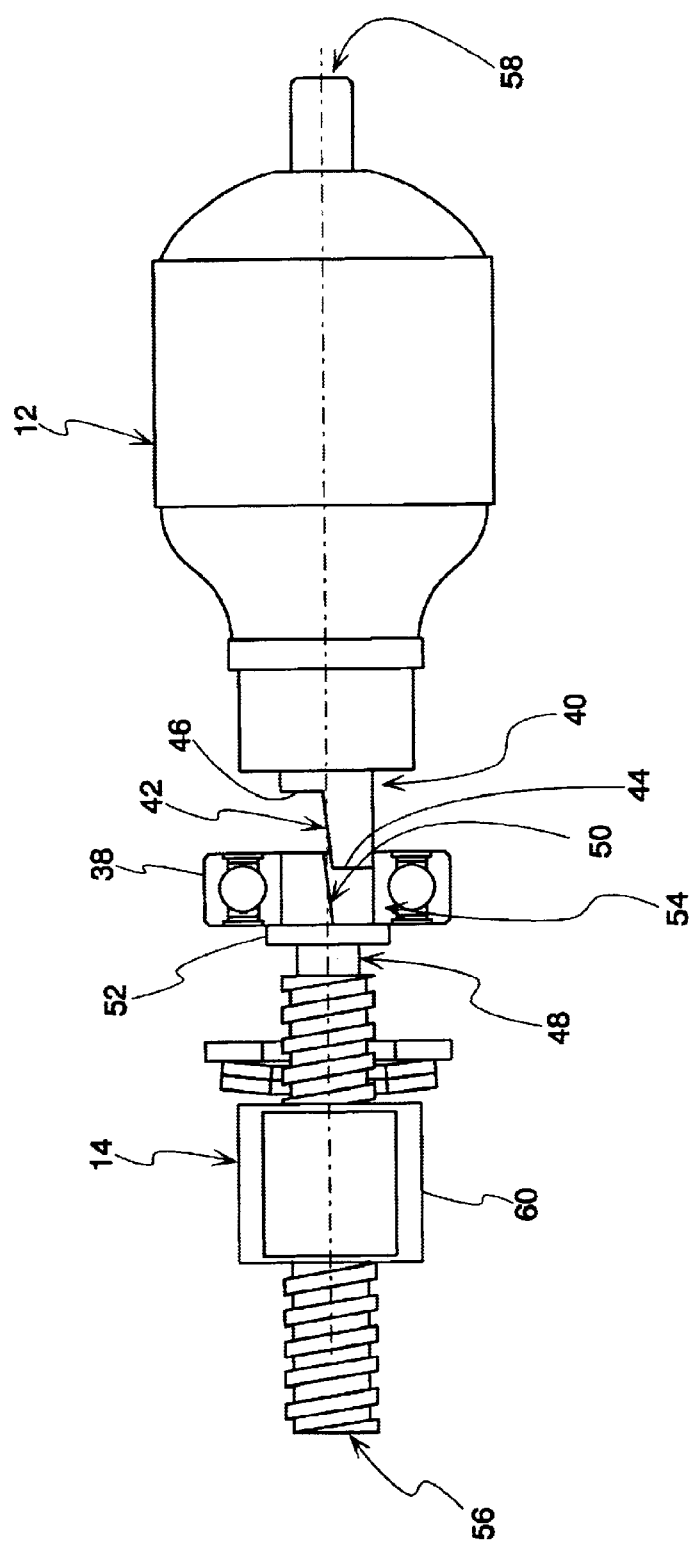
FIG. 2 is an enlarged cross-sectional view of the spindle and bearing member with the spindle fully deformed around the bearing member with the forming tool and the constraining tool in the engaged position.

As shown in closer detail in FIG. 2, the formation of bearing assembly 10 includes the method of deforming the proximal end 84 of spindle 12 with a forming tool 60, such as an orbital pivoting tool, to retain bearing member 20 to spindle 12 and prevent axial translation between spindle 12 and bearing member 20 about rotational axis A.

Figure 3:
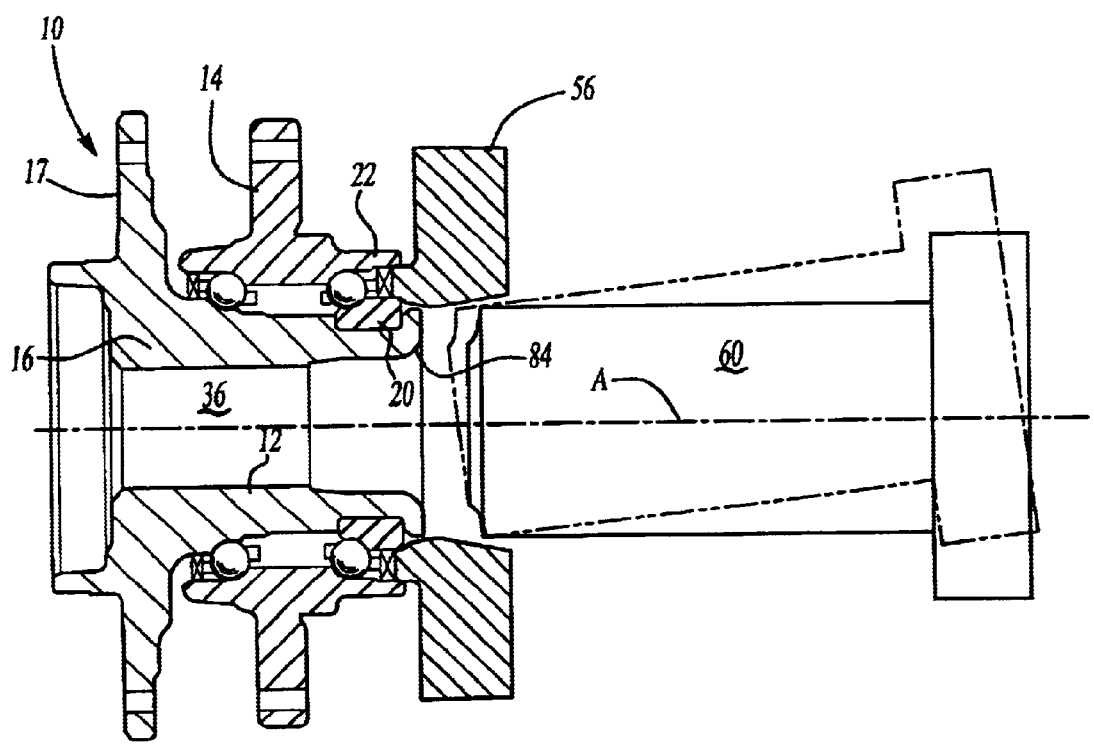
FIG. 3 is a cross-sectional view of the spindle with the forming tool in an extracted position (shown in solid lines) and in the engaged position (shown in phantom lines).
Figure 1:
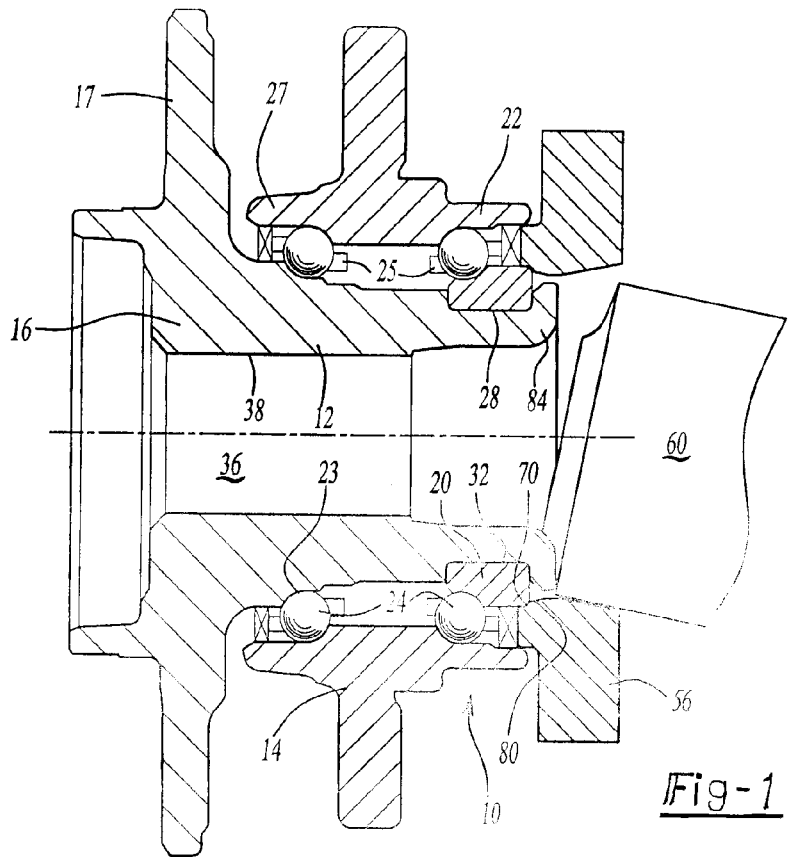
Figure 2:
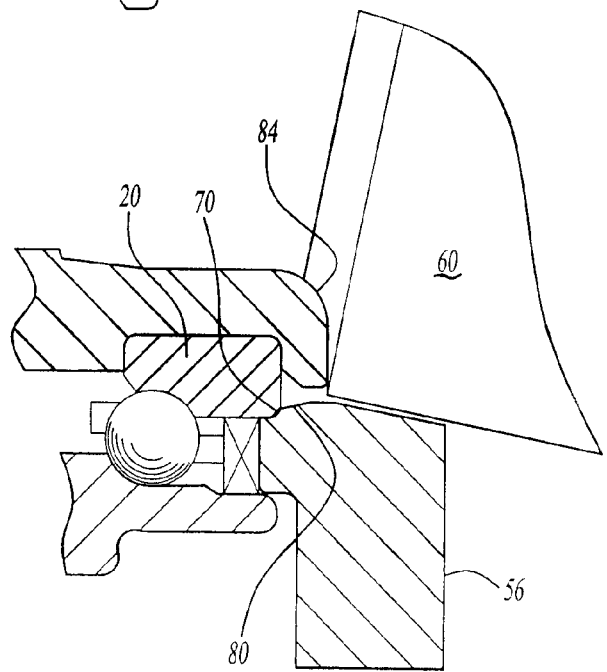
Figure 3:
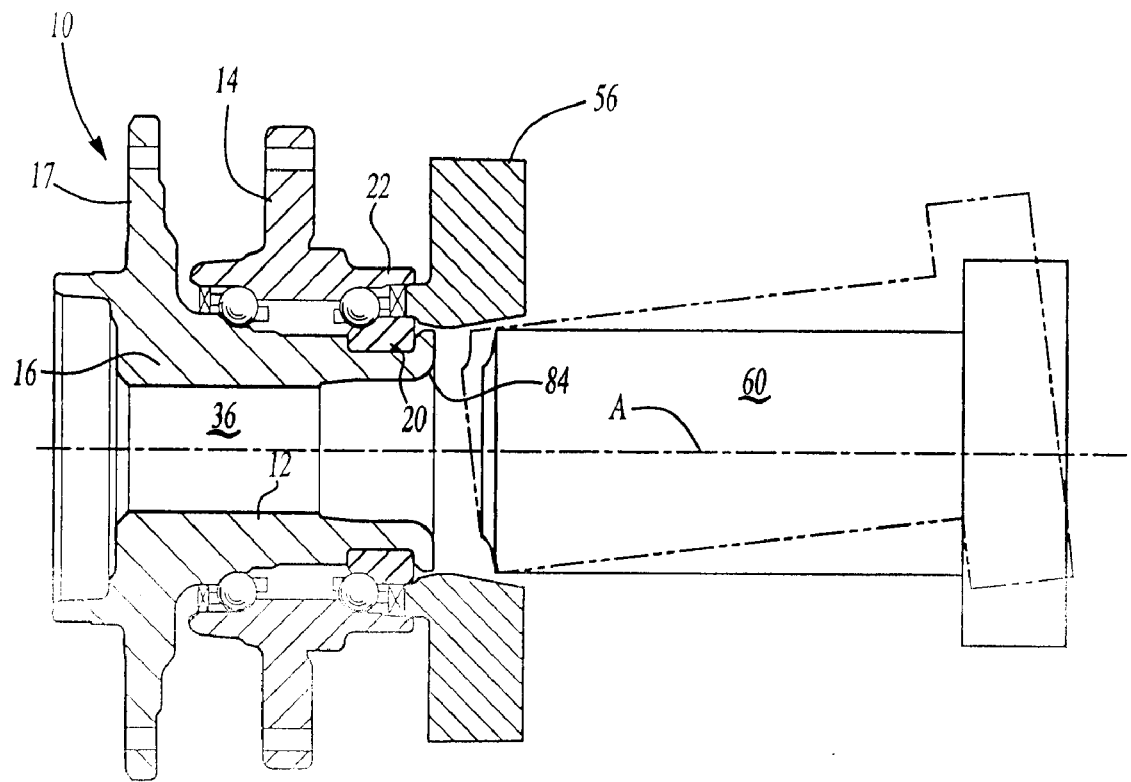

As shown in further detail in FIG. 3, simultaneous with the deformation of the proximal end 84 of the spindle 12, a tool 56, applies an axial force to the outer surface 70 of the inner first bearing member 20 through a featured outer surface 80 of the tool 56. The resulting force between the two outer surfaces 70 and 80 is a radial force opposing a deforming force on the inner first bearing member 20 during the deformation of the proximal end 84 of the spindle 12. The featured outer surface 70 of the bearing member 20 and the featured outer surface 80 of the tool 56 have a mated geometry consisting of a chamfer, a blend or any combination of mated surfaces which result in a radial force between the outer surfaces 70 and 80 during the deformation process of the spindle 12. The radial force created between the outer surfaces 70 and 80 during the forming process of spindle 20 must be sufficient to counter the deformation forces on the inner first bearing member 20 during the forming of the spindle 12 to prevent excessive deflections that are retained in the finished assembly and associated degradation of the inner first bearing member 20.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A wheel bearing forming assembly for deforming an end of a spindle about an inner bearing member to secure the inner bearing member to the spindle, said assembly comprising:

a forming tool rotatably mounted about a rotational axis and having a deformation surface for engaging and deforming the end of the spindle about the inner bearing member with the inner bearing member receiving a deforming force during said deforming of the spindle;

a constraining tool movable relative to said forming tool in an axial direction substantially parallel with said axis, said constraining tool having a contact surface adapted to abut an outer surface of the inner bearing member during said deforming of the spindle; and said contact surface of said constraining tool defining an angled chamfer extending outwardly away from said forming tool and said axis for presenting an opposing radial force against the inner bearing member opposite said deforming force such that as said forming tool applies an increased radial deforming force to deform the end of the spindle, said constraining tool moves axially toward the inner bearing member and said angled chamfer applies an increased opposing force opposite said deforming force thereby preventing distortion of the inner bearing member about said rotational axis.

2. The assembly as set forth in claim 1 wherein said forming tool is further defined as an orbital pivoting tool.

* * * * *

UNITED STATES PATENT AND TRADEMARK OFFICE
CERTIFICATE OF CORRECTION

PATENT NO.     : 6,622,377 B1
DATED          : September 23, 2003
INVENTOR(S)    : Johnson et al.

It is certified that error appears in the above-identified patent and that said Letters Patent is hereby corrected as shown below:

Drawings,
Delete drawing sheets 1-2, and substitute therefor the attached drawing sheets 1-2.

Signed and Sealed this

Thirtieth Day of December, 2003

JAMES E. ROGAN
*Director of the United States Patent and Trademark Office*